(12) United States Patent
Cheng

(10) Patent No.: US 9,210,241 B2
(45) Date of Patent: Dec. 8, 2015

(54) SLIDING PLATE HINGE OF PORTABLE ELECTRONIC DEVICE TERMINAL

(75) Inventor: Guanlun Cheng, Hangzhou (CN)

(73) Assignee: HANGZHOU AMPHENOL PHOENIX TELECOM PARTS CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 14/234,196

(22) PCT Filed: Mar. 15, 2012

(86) PCT No.: PCT/CN2012/072359
§ 371 (c)(1),
(2), (4) Date: Jan. 22, 2014

(87) PCT Pub. No.: WO2013/016954
PCT Pub. Date: Feb. 7, 2013

(65) Prior Publication Data
US 2014/0153848 A1 Jun. 5, 2014

(30) Foreign Application Priority Data

Jul. 29, 2011 (CN) ...................... 2011 2 0273578 U

(51) Int. Cl.
*F16C 29/02* (2006.01)
*H04M 1/02* (2006.01)
*F16C 29/00* (2006.01)
*B23Q 1/28* (2006.01)

(52) U.S. Cl.
CPC ........... *H04M 1/0237* (2013.01); *F16C 29/002* (2013.01); *H04M 1/0239* (2013.01); *B23Q 1/28* (2013.01)

(58) Field of Classification Search
CPC .... F16C 29/002; F16C 29/005; H04M 1/026; H04M 1/035; H04M 1/0239; H04M 1/0237; G06F 1/1624; Y10T 16/54025; Y10T 16/53826; B23Q 1/28
USPC .......... 384/7, 10, 21, 26, 35, 37, 39; 361/727, 361/679.01, 675.05; 455/575.4
See application file for complete search history.

(56) References Cited

U.S. PATENT DOCUMENTS

| | | | | |
|---|---|---|---|---|
| 7,869,844 B2 * | 1/2011 | Lee et al. | .................... | 455/575.4 |
| 7,991,443 B2 * | 8/2011 | Chiang | ....................... | 455/575.4 |
| 8,032,192 B2 * | 10/2011 | Park | ........................... | 455/575.4 |
| 8,260,383 B2 * | 9/2012 | Yuan | .......................... | 455/575.4 |

(Continued)

FOREIGN PATENT DOCUMENTS

WO    WO 2009020333 A1 *   2/2009  ............. G03B 11/00

*Primary Examiner* — Marcus Charles
(74) *Attorney, Agent, or Firm* — Han IP Corporation

(57) ABSTRACT

A sliding plate hinge of a portable electronic device terminal includes a fixed plate and a sliding plate. A sliding-guide groove for the sliding plate is disposed at either side of the fixed plate. A frictional component supported by an elastic component is also disposed at either side of the fixed plate respectively. The frictional components at the two sides form a compression fit with the side surface of the sliding plate or with the side surface of a component fixedly connected to the sliding plate, so as to generate side pressure against the sliding plate or the component fixedly connected to the sliding plate. The design utilizes the frictional components to generate side pressure against the sliding plate or the component fixedly connected to the sliding plate and thus generate frictional damping, ensuring that the sliding plate hinge has a comfortable hand-feel even in the absence of a drive spring.

12 Claims, 9 Drawing Sheets

(56) References Cited

U.S. PATENT DOCUMENTS

| | | | |
|---|---|---|---|
| 8,379,396 B2 * | 2/2013 | Huang et al. | 361/749 |
| 8,593,801 B2 * | 11/2013 | Minowa | 361/679.55 |
| 8,662,753 B2 * | 3/2014 | Mitsui | 384/26 |
| 8,811,034 B2 * | 8/2014 | Lee | 361/814 |
| 2004/0085739 A1 * | 5/2004 | Lee et al. | 361/727 |
| 2007/0060220 A1 * | 3/2007 | Hsu | 455/575.4 |
| 2007/0091555 A1 * | 4/2007 | Lee | 361/683 |
| 2008/0064455 A1 * | 3/2008 | Joo et al. | 455/575.4 |
| 2008/0090627 A1 * | 4/2008 | Jeong et al. | 455/575.4 |
| 2009/0149228 A1 * | 6/2009 | Wang et al. | 455/575.4 |
| 2010/0134962 A1 * | 6/2010 | Wu | 384/10 |

* cited by examiner

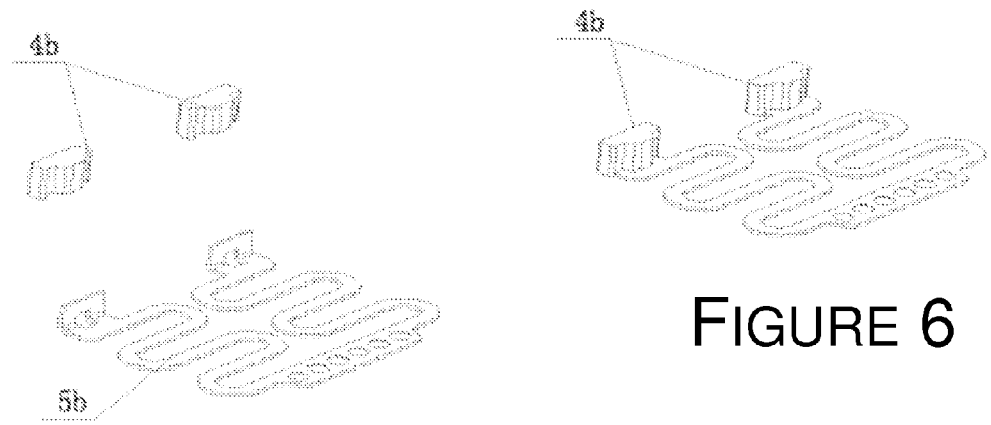
FIGURE 6
FIGURE 7
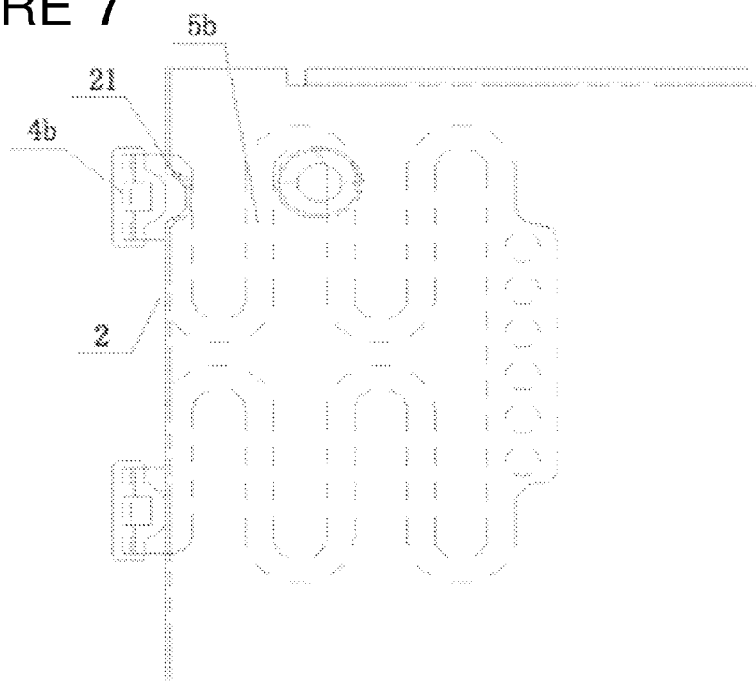
FIGURE 8

SLIDING PLATE HINGE OF PORTABLE ELECTRONIC DEVICE TERMINAL

CROSS REFERENCE TO RELATED APPLICATIONS

This application is the U.S. national phase application of International application number PCT/CN2012/072359, filed on 15 Mar. 2012, which claims the priority benefit of China Patent Application No. 201120273578.6, filed on 29 Jul. 2011. The above-identified application is hereby incorporated by reference in their entirety.

TECHNICAL FIELD

The present disclosure relates to a sliding plate hinge for a portable electronic device terminal. The portable electronic device may include electronic products such as a mobile phone, a PHS (Personal Handphone System), an electronic dictionary, a laptop, an e-book and a handheld game player, etc.

BACKGROUND

A conventional sliding plate hinge is a semiautomatic hinge with a drive spring. The sliding plate hinge includes a fixed plate and a slide plate which are featured by relative sliding, and between which are connected with a driving mechanism facilitating the relative sliding. The drive spring is used as the driving component of the driving mechanism. When an operator turns on or turns off a slide machine body, the drive spring is stretched, compressed or twisted and the like, thus accumulating energy. After the slide machine body is pushed past a critical point (in other words, after the spring is converted from accumulation of energy to release of energy), the slide machine body, driven by the spring, continues sliding, thus enabling a portable mobile electronic device to be turned on and off.

The spring plays a part in the driving mechanism. However, the spring is positioned between the fixed plate and the sliding plate, taking up considerable space. This greatly restricts thickness-reduction design of the portable electronic device terminal. In addition, the electronic device terminal is unable to stop at any time when the sliding plate is turned on.

SUMMARY

The present disclosure aims at solving the aforementioned technical problem by providing a sliding plate hinge for a portable electronic device terminal, which is characterized in that the sliding plate is able to stop at any time with good sliding hand-feel. For this purpose, the present disclosure adopts a technical scheme as follows: the sliding plate hinge comprises a fixed plate and a sliding plate. A sliding-guide groove for the sliding plate is disposed on either side of the fixed plate. A frictional component supported by an elastic component is also disposed on either side of the fixed plate respectively. The frictional component at either of the two sides forms a compression fit with the side surface of the sliding plate or with the side surface of a component fixedly connected to the sliding plate, so as to generate side pressure against the sliding plate or the component fixedly connected to the sliding plate.

On the basis of adopting the above-mentioned technical scheme, the present disclosure also can adopt a further technical scheme as follows: the frictional component is positioned on the groove bottom of the sliding-guide groove.

The elastic component may be a spring, and the frictional component may be fixedly plugged in and connected to the spring.

The frictional component may be supported by a symmetrical spring, divided into two or more independent spring supports. The elastic component may be supported by the spring which is a symmetrical spring, both ends of the spring are connected to the sliding-guide groove or the fixed plate. The frictional component may be connected to the central part of spring.

The fixed plate may be provided with a guide structure which is movable as the frictional component is supported by the elastic component. The frictional component may be provided with a guide fit structure for fitting with the guide structure.

The elastic component may be fixed on the fixed plate and is connected to the frictional component by passing through between the fixed plate and the sliding-guide groove.

The elastic component may be connected with the fixed plate, and the frictional component may be connected with the elastic component.

The elastic component may be a metal spring trip which is shaped like a groove, and the elastic component may be wrapped around the bending outside of the sliding-guide groove arranged on the fixed plate.

By adopting the above-mentioned technical scheme, the invention can utilize the frictional components to generate side pressure against the sliding plate or the component fixedly connected to the sliding plate and thus generating frictional damping, ensuring that the sliding plate hinge has a comfortable hand-feel even in the absence of a drive spring. The sliding plate can stop at any time during sliding without damaging the external coated surface of the sliding plate. In addition, because the drive spring is not required, the thickness of the hinge can be reduced.

BRIEF DESCRIPTION OF THE DRAWINGS

FIG. 6 is a schematic view regarding combination of the frictional component and the elastic component supporting part in Embodiment 2 of the present disclosure.

FIG. 7 is an explosive view of the frictional component and the elastic component supporting part in Embodiment 2 of the present disclosure.

FIG. 8 is a schematic view regarding combination of the frictional component and the sliding plate in Embodiment 2 of the present disclosure.

DETAILED DESCRIPTION OF THE PREFERRED EMBODIMENTS

Figure 1:
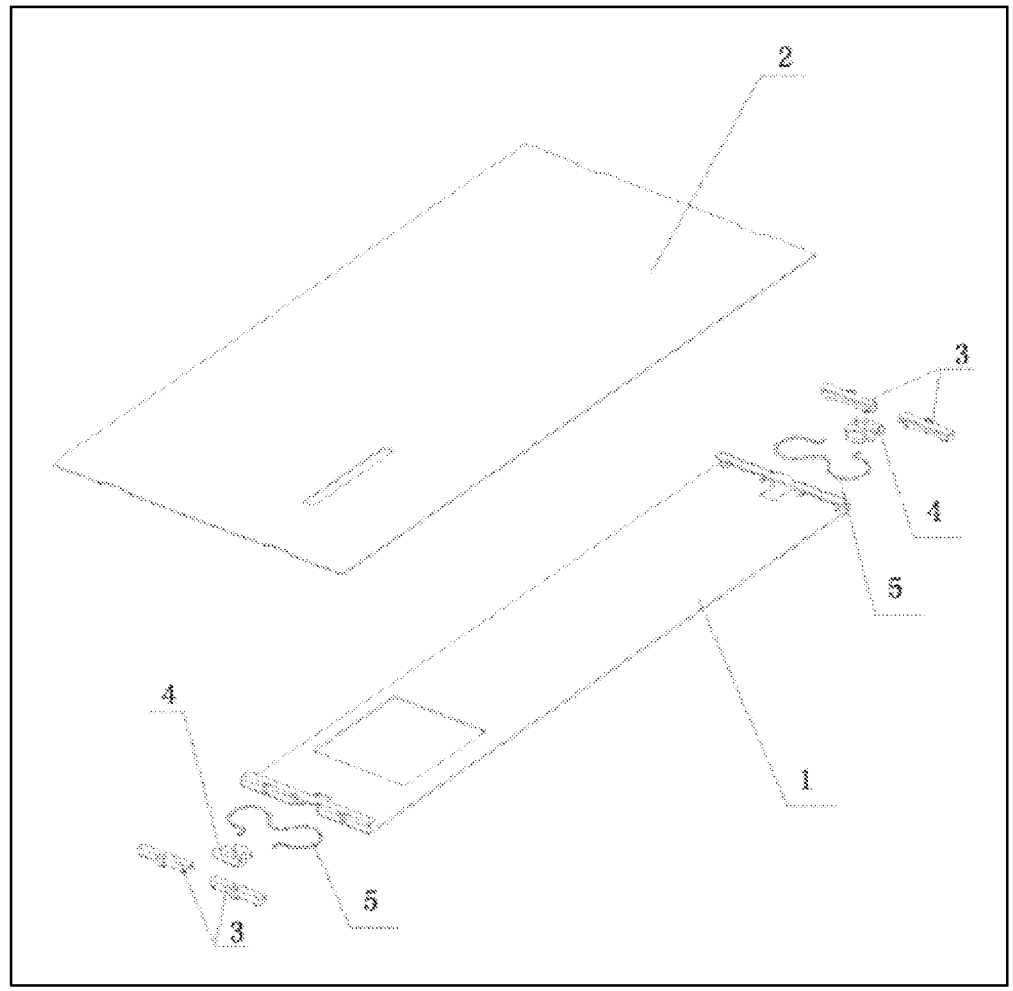
FIG. 1 is an exploded view of Embodiment 1 of the present disclosure, showing various components of the embodiment.
Figure 2:
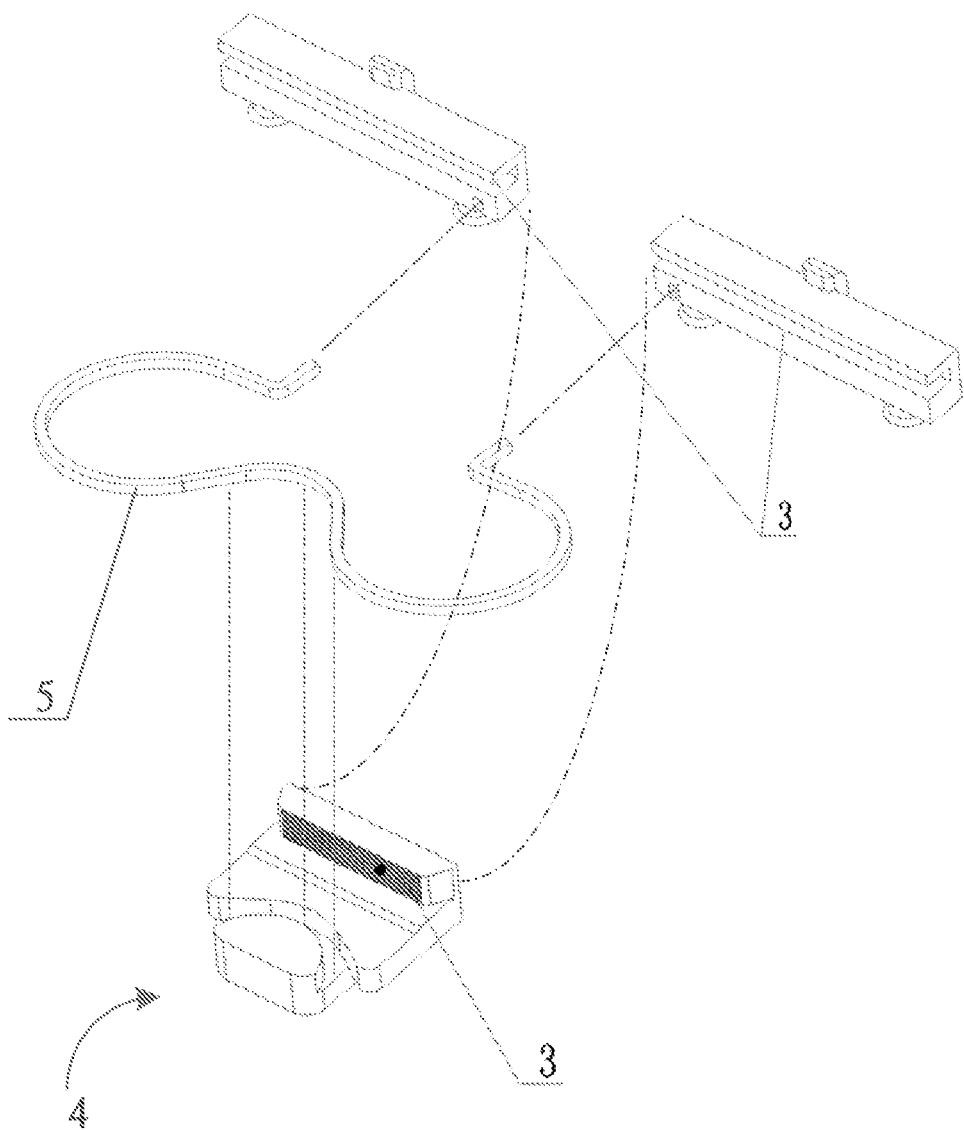
FIG. 2 is an exploded view of the frictional component and the elastic component that supports the frictional component according to Embodiment 1 of the present disclosure.
Figure 3:
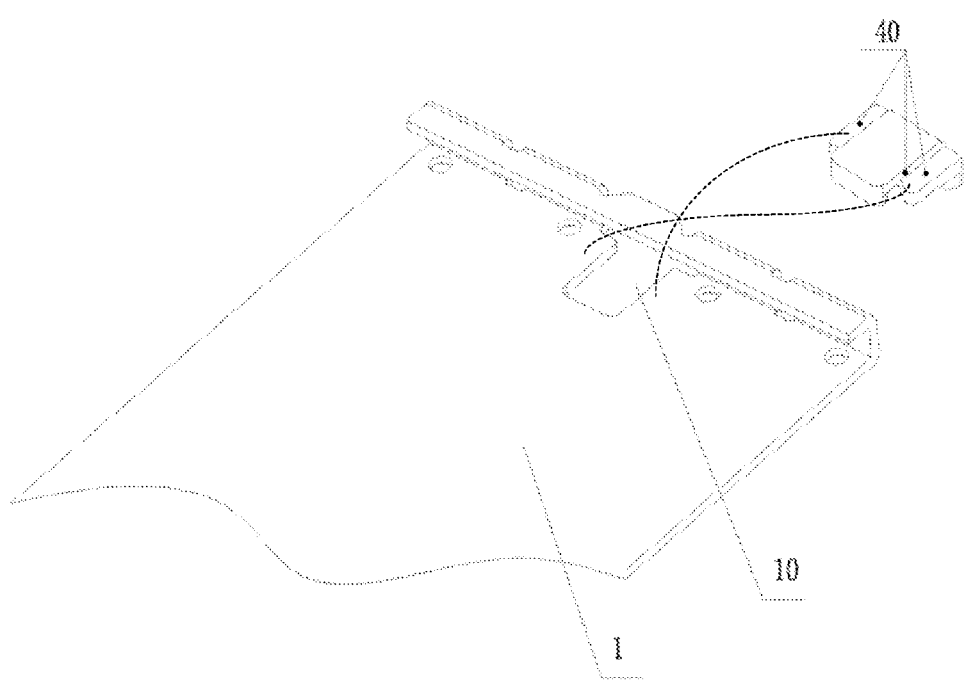
FIG. 3 is an exploded view of the fixed plate fitting with the frictional component as disclosed in Embodiment 1 of the present disclosure.
Figure 4A:
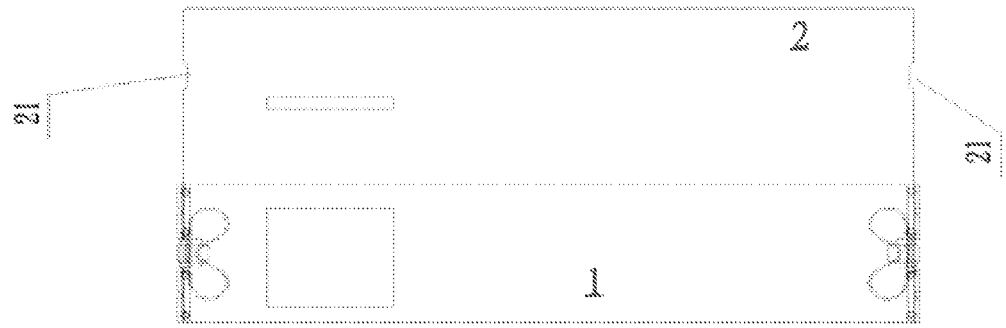
FIGS. 4A-4C each respectively shows a different position of the sliding plate relative to the fixed plate according to Embodiment 1 of the present disclosure.
Figure 4B:
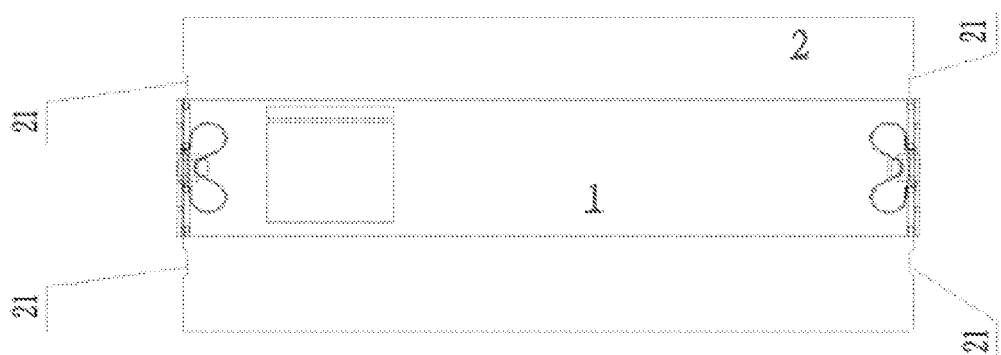
Figure 4C:
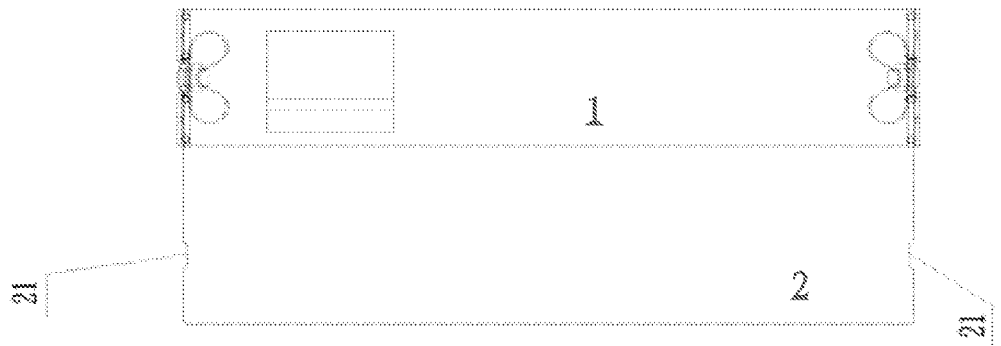

As for Embodiment 1, please refer to FIGS. 1-4.

The sliding plate hinge in the present disclosure comprises a fixed plate 1 and a sliding plate 2. A sliding-guide groove 3 for the sliding plate is disposed on either side of the fixed plate. A frictional component 4 supported by an elastic component is also disposed on either side of the fixed plate respectively. The frictional components 4 on the two sides form a compression fit with the side surface of the sliding plate 2, so as to generate side pressure against the sliding plate.

The frictional component 4 is positioned on the groove bottom of the sliding-guide groove 3. The elastic component may be a spring 5, and the frictional component 4 is supported by the spring 5 which may be a symmetrical spring. Both ends of the spring 5 are connected to the sliding-guide groove 3, and the frictional component 4 is connected to the central part of spring.

The fixed plate 1 is provided with a guide structure which is movable because the frictional component is supported by the elastic component. The guide structure can be a slot 10 incised on the fixed plate 1 and the fixed plate portion around the slot. The frictional component 4 is provided with a guide fit structure 40 for fitting with the guide structure, which can be a guide block positioned on the bottom of the frictional component 4 and for fitting with the slot 10.

The limit position of the slide stroke relative to the sliding plate is provided with a groove 21 fitting with the frictional component 4. The groove 21 is matched to the frictional component 4, which provides the hinge with a locking and fixing function. When sliding to the end, the sliding plate 2 is snapped, locked and fixed.

Supported by the spring 5, the frictional component 4 forms positive pressure on the side surface of the sliding plate 2. When the sliding plate 2 is sliding relative to the sliding-guide groove, certain friction force is formed between the sliding plate 2 and the frictional component 4. An equilibrium force system is formed by the friction force and external force exerted on the sliding plate 2, thus realizing the function of stopping at discretion and comfortable hand-feel.

Figure 5A:
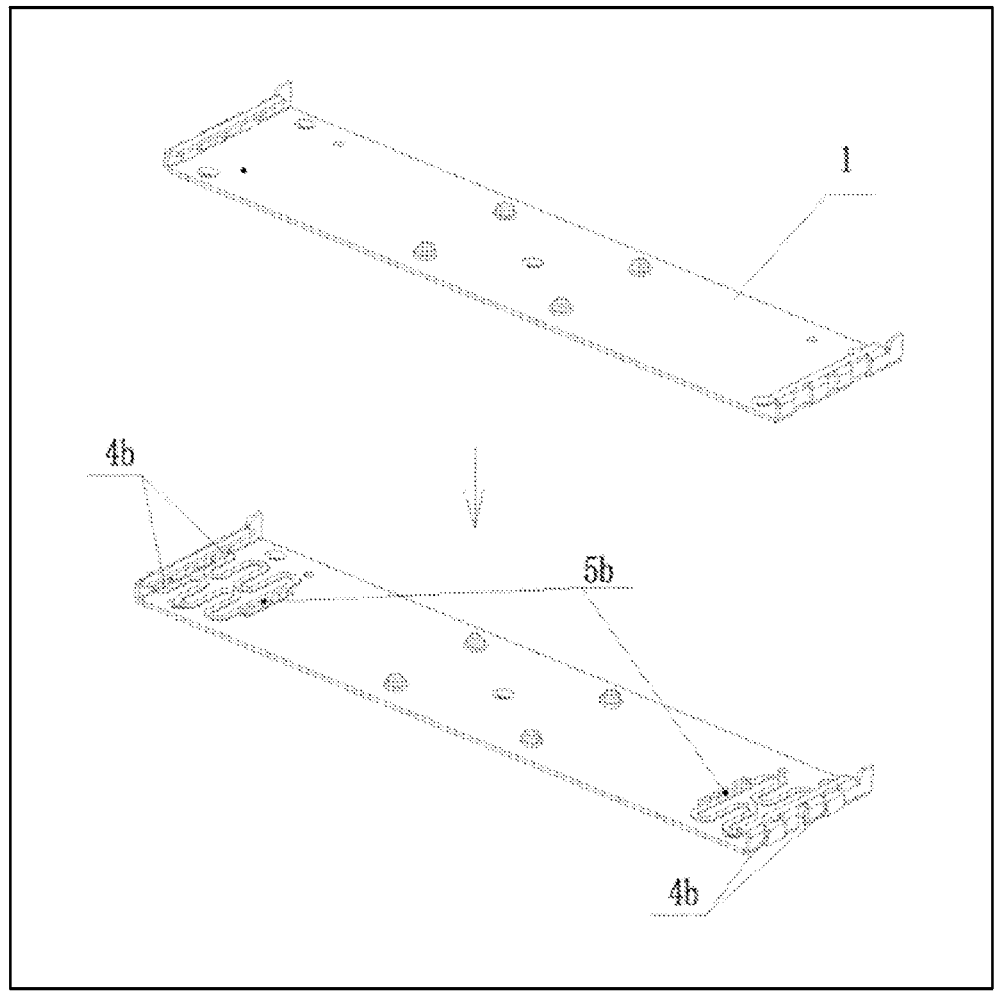
FIGS. 5A and 5B each is a schematic view regarding an assembly step according to Embodiment 2 of the present disclosure.
Figure 5B:
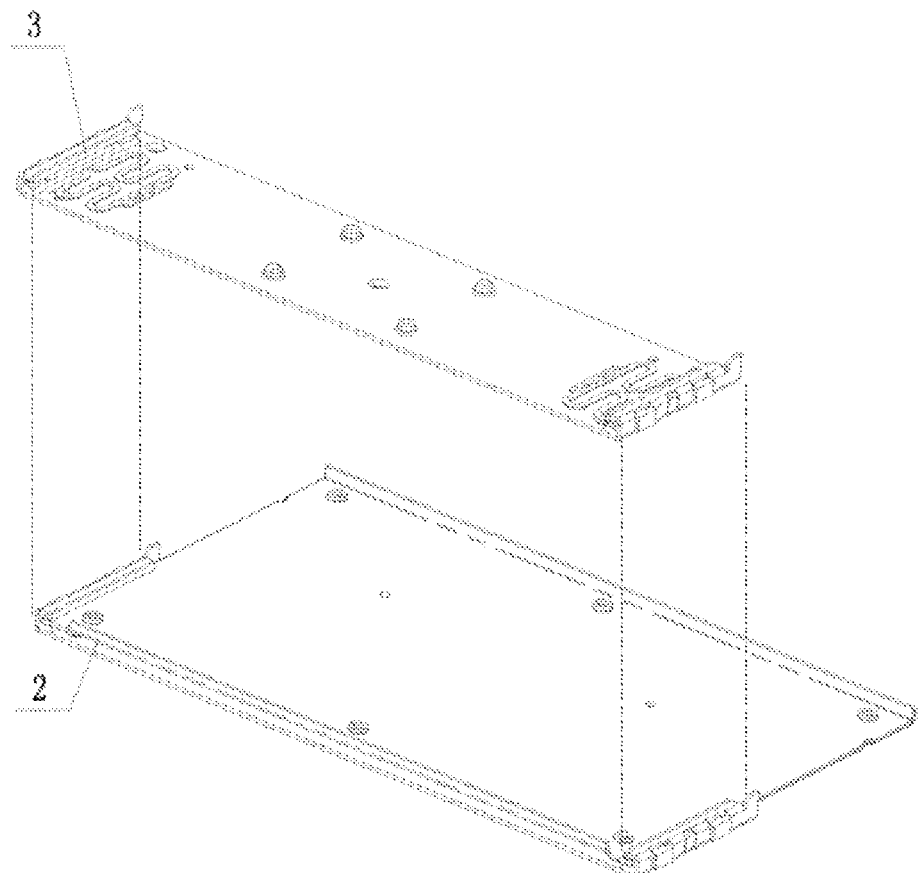

As for Embodiment 2, please refer to FIGS. 5-8.

In the embodiment, the frictional component 4b is also positioned on the groove bottom of the sliding-guide groove and is supported by a symmetrical spring 5b, thus clamping the side surface of the sliding plate 2. The limit position of the slide stroke relative to the sliding plate is provided with a groove 21 fitting with the frictional component.

Different from Embodiment 1, in this embodiment, two frictional components are arranged on either side respectively, the spring 5b is fixed on the fixed plate 1, and passes through between the fixed plate 1 and the sliding-guide groove 3. Both ends of the spring are fixedly plugged in and connected to the frictional component 4b respectively.

Figure 9:
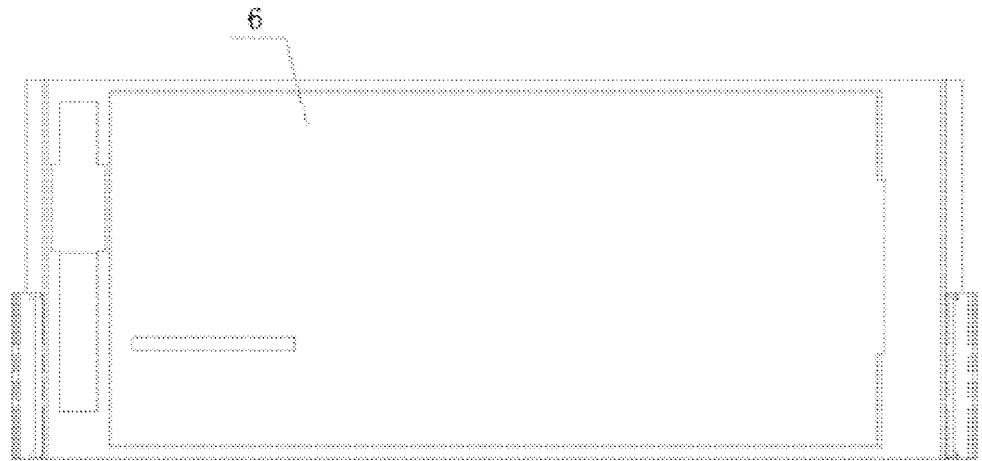
FIG. 9 is a vertical view of Embodiment 3 in the present disclosure.
Figure 10:
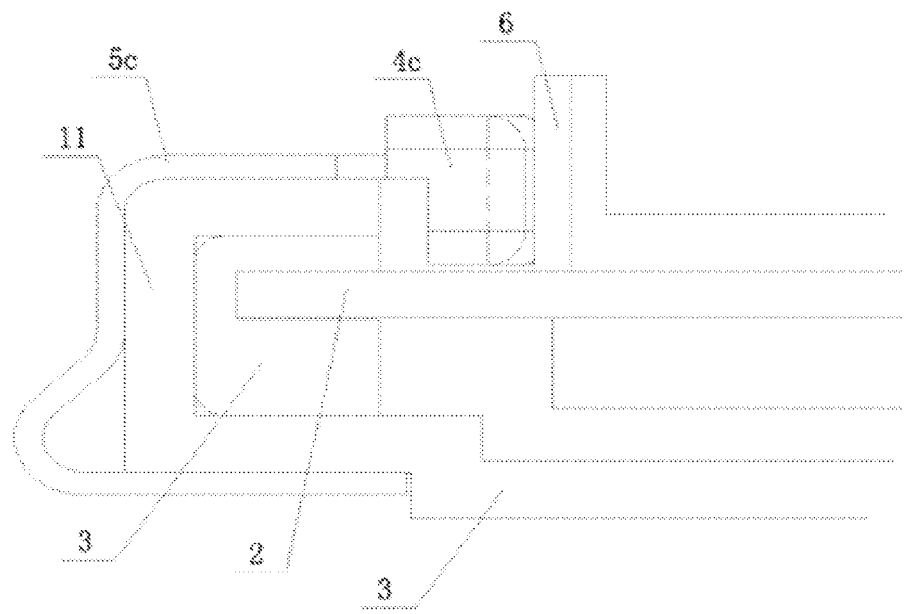
FIG. 10 is a cross sectional view of Embodiment 3 in the present disclosure, showing fitting and location of the frictional component, the elastic component supporting part, the fixed plate, the sliding-guide groove and the sliding plate etc.
Figure 11:
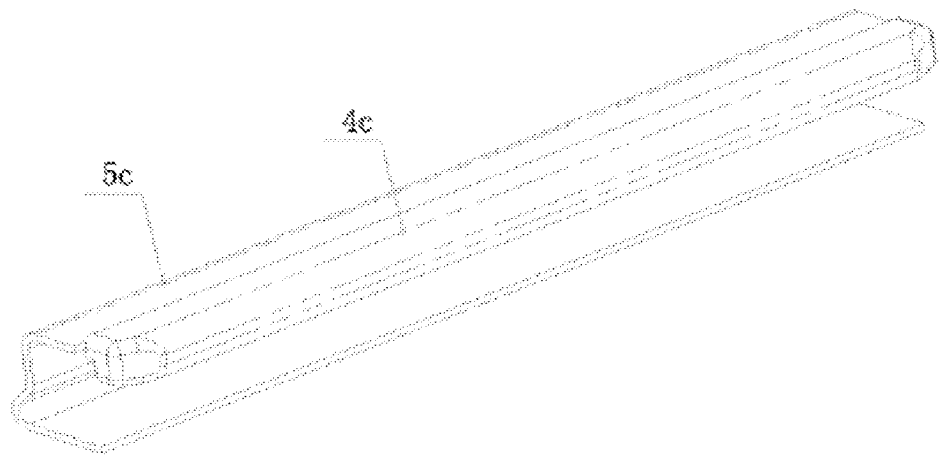
FIG. 11 is a schematic view regarding combination of the frictional component and the elastic component supporting part in Embodiment 3 of the present disclosure.
Figure 12:
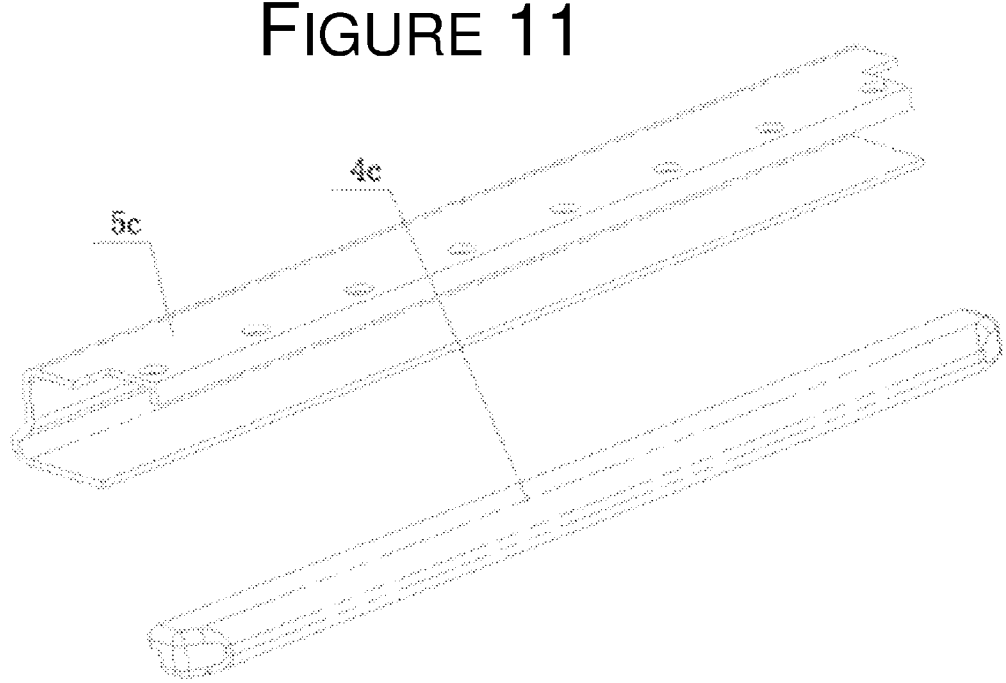
FIG. 12 is an explosive view of the frictional component and the elastic component supporting part in Embodiment 3 of the present disclosure.

As for Embodiment 3, please refer to FIGS. 9-12.

In the embodiment, the elastic component supporting the frictional component is a metal spring strip 5c, which is connected (for example, welded) to the fixed plate 1. The metal spring strip is shaped like a groove and is wrapped around the bending 11 outside of the sliding-guide groove 3 arranged on the fixed plate. The frictional component 4c is plugged in and connected to the groove wall of the elastic component by using inlay injection.

The frictional component 4c clamps the side surface of a component fixedly connected to the sliding plate 2, the component can be a display screen support 6.

What is claimed is:

1. A sliding plate hinge of a portable electronic device terminal, comprising:
   a fixed plate; and
   a sliding plate, wherein:
      a sliding-guide groove for the sliding plate is disposed on either of two sides of the fixed plate;
      a frictional component supported by an elastic component is disposed on either side of the fixed plate respectively;
      the frictional component on either of the two sides forms a compression fit with a side surface of the sliding plate or with a side surface of a component fixedly connected to the sliding plate, so as to generate side pressure against the sliding plate or the component fixedly connected to the sliding plate; and
      a limit position of a slide stroke relative to the sliding plate or the component fixedly connected to the sliding plate is provided with a groove fitting with the frictional component.

2. The sliding plate hinge of a portable electronic device terminal of claim 1, wherein the frictional component is positioned on a groove bottom of the sliding-guide groove.

3. The sliding plate hinge of a portable electronic device terminal of claim 2, wherein the elastic component comprises a spring, and wherein the frictional component is fixedly plugged in and connected to the spring.

4. The sliding plate hinge of a portable electronic device terminal of claim 2, wherein the elastic component comprises a symmetrical spring, divided into two or more independent spring supports.

5. The sliding plate hinge of a portable electronic device terminal of claim 2, wherein the elastic component is fixed on the fixed plate and is connected to the frictional component by passing through between the fixed plate and the sliding-guide groove.

6. The sliding plate hinge of a portable electronic device terminal of claim 5, wherein a limit position of a slide stroke relative to the sliding plate or the component fixedly connected to the sliding plate is provided with a groove fitting with the frictional component.

7. The sliding plate hinge of a portable electronic device terminal of claim 1, wherein the elastic component is connected with the fixed plate, and wherein the frictional component is connected with the elastic component.

8. The sliding plate hinge of a portable electronic device terminal of claim 7, wherein the elastic component comprises a metal spring trip which is shaped like a groove, and wherein the elastic component is wrapped around a bending outside of the sliding-guide groove arranged on the fixed plate.

9. A sliding plate hinge of a portable electronic device terminal, comprising:
   a fixed plate; and
   a sliding plate, wherein:
      a sliding-guide groove for the sliding plate is disposed on either of two sides of the fixed plate;
      a frictional component supported by an elastic component is disposed on either side of the fixed plate respectively;
      the frictional component on either of the two sides forms a compression fit with a side surface of the sliding plate or with a side surface of a component fixedly connected to the sliding plate, so as to generate side pressure against the sliding plate or the component fixedly connected to the sliding plate;

the frictional component is positioned on a groove bottom of the sliding-guide groove; and the elastic component comprises a symmetrical spring, wherein both ends of the spring are connected to the sliding-guide groove or the fixed plate, and wherein the frictional component is connected to a central part of spring.

10. The sliding plate hinge of a portable electronic device terminal of claim 9, wherein the fixed plate is provided with a guide structure which is movable as the frictional component is supported by the elastic component, and wherein the frictional component is provided with a guide fit structure configured to fit with the guide structure.

11. The sliding plate hinge of a portable electronic device terminal of claim 10, wherein a limit position of a slide stroke relative to the sliding plate or the component fixedly connected to the sliding plate is provided with a groove fitting with the frictional component.

12. The sliding plate hinge of a portable electronic device terminal of claim 9, wherein a limit position of a slide stroke relative to the sliding plate or the component fixedly connected to the sliding plate is provided with a groove fitting with the frictional component.

\* \* \* \* \*